(12) United States Patent
Chen et al.

(10) Patent No.: US 11,511,828 B1
(45) Date of Patent: Nov. 29, 2022

(54) HUB MOTOR WITH INTERNALLY PROVIDED TORQUE TRANSDUCER

(71) Applicant: Jiangsu Channelon Electronics Group Co., Ltd., Jiangsu (CN)

(72) Inventors: Dong Chen, Jiangsu (CN); Fumio Kurebayashi, Jiangsu (CN); Xianwen Cai, Jiangsu (CN); Ming Hu, Jiangsu (CN); Meng Li, Jiangsu (CN)

(73) Assignee: JIANGSU CHANNELON ELECTRONICS GROUP CO., LTD., Jiangsu (CN)

( * ) Notice: Subject to any disclaimer, the term of this patent is extended or adjusted under 35 U.S.C. 154(b) by 0 days.

(21) Appl. No.: 17/834,071

(22) Filed: Jun. 7, 2022

(51) Int. Cl.
*B62M 6/50* (2010.01)
*G01L 5/00* (2006.01)
*H02K 11/24* (2016.01)
*B62M 6/60* (2010.01)

(52) U.S. Cl.
CPC ............... *B62M 6/50* (2013.01); *B62M 6/60* (2013.01); *G01L 5/0042* (2013.01); *H02K 11/24* (2016.01)

(58) Field of Classification Search
CPC ..... B62J 43/13; B62J 3/10; B62J 25/04; B62J 43/20; B62J 45/00; B62J 45/10; B62K 9/00; B62K 11/14; B62K 2204/00; B62M 6/70; B62M 6/90
See application file for complete search history.

(56) References Cited

U.S. PATENT DOCUMENTS

| | | | | |
|---|---|---|---|---|
| 9,221,516 | B1* | 12/2015 | Song | F16H 9/26 |
| 2011/0124454 | A1* | 5/2011 | Song | B62M 6/55 |
| | | | | 474/158 |
| 2016/0176474 | A1* | 6/2016 | Wu | H02K 7/116 |
| | | | | 180/220 |
| 2018/0056774 | A1* | 3/2018 | Chan | B60K 17/145 |
| 2019/0315241 | A1* | 10/2019 | Lin | H02K 11/0094 |

FOREIGN PATENT DOCUMENTS

| | | |
|---|---|---|
| CN | 207141296 U | 3/2018 |
| CN | 208453189 U | 2/2019 |

(Continued)

OTHER PUBLICATIONS

Chinese Language Office Action search report mailed in Application No. 2021108015024, dated Mar. 17, 2022.

(Continued)

*Primary Examiner* — Kevin Hurley
*Assistant Examiner* — Marlon A Arce
(74) *Attorney, Agent, or Firm* — McClure, Qualey & Rodack, LLP

(57) ABSTRACT

A motor and a torque transducer box, an end cover front panel is installed at a front portion of the motor, the torque transducer box is installed at a front portion of the end cover front panel, a transmission pole is installed in the an extrusion rotating wheel, thermal dissipation and explosion proof boxes are installed on a surface of the motor, a sealing and thermal insulation module is installed at a front portion of the transmission pole, two sets of cable wrapping posts are symmetrically provided at the surface of the motor, and two sets of correction boxes are symmetrically provided at a surface of a rotor assembly.

8 Claims, 8 Drawing Sheets

(56) References Cited

FOREIGN PATENT DOCUMENTS

| CN | 211519778 U | 9/2020 |
|---|---|---|
| CN | 112109840 A | 12/2020 |

OTHER PUBLICATIONS

English language translation of search report mailed in Application No. 2021108015024, dated Mar. 17, 2022.
Chinese Language Office Action mailed in Application No. 2021108015024, dated Mar. 17, 2022.
English language translation of Office Action mailed in Application No. 2021108015024, dated Mar. 17, 2022.
Response to Office Action mailed in Application No. 2021108015024, dated Mar. 17, 2022.
English language translation of response to Office Action mailed in Application No. 2021108015024, dated Mar. 17, 2022.
Replacement/amended Specification, claims, and drawings, submitted with response to Office Action in China Application No. 2021108015024.
English translation of replacement/amended specification, claims and drawings, submitted in response to Office Action n China Application No. 2021108015024.
Notice of Allowance dated Apr. 28, 2022 in China Application No. 2021108015024.
English language translation of Notice of Allowance dated Apr. 28, 2022 in China Application No. 2021108015024.

\* cited by examiner

HUB MOTOR WITH INTERNALLY PROVIDED TORQUE TRANSDUCER

TECHNICAL FIELD

The present invention relates to the technical field of electromagnetic reducing motors, specifically a hub motor with internally provided torque transducer.

BACKGROUND TECHNOLOGY

With development of intelligent transportation, electronically power assisted cycles (Pedelec) have become popular, and to realize organic combination between pedaling and power assistance, the way that a torque transducer and a motor control system are combined has gained more and more attention across the industry, and in the present invention, a novel method is provided for combination between the torque transducer and the motor control system—a hub motor with internally provided torque transducer.

Deficiencies with existing hub motors are:

1. In a cited document CN207082972U, a hub motor and a hub motor system are disclosed, "wherein the hub motor comprises a fixing base, at least one driving wheel and an encoding module; the at least one driving wheel is connected with the fixing base by a wheel shaft, the encoding module is fixed on the fixing base; a drive gear is provided on the at least one driving wheel, the drive gear rotates synchronously with the at least one driving wheel; the drive gear is engaged and connected with a transmission gear in the encoding module; a diameter of the drive gear is bigger than a diameter of the transmission gear; when the at least one driving wheel rotates, the drive gear revolves synchronously; the drive gear drives the transmission gear to rotate, so that the encoding module will output encoding signals. In the present invention, encoding precision of the hub motor can be improved and precision of motion control over the hub motor can be improved consequently", however, during use, torque output of the hub motor is controlled by the encoding module, flexible regulation and control cannot be realized, and it is not possible to adjust continuously power output of the control motor to accommodate with stepping force from a rider in absence of an assembly capable of real time dynamic detection;

2. In another cited document CN109774457A a hub motor for electric car is disclosed, "comprising a wheel hub and a hub motor. The wheel hub is connected with the hub motor. The wheel hub comprises a rotating part and a fixing part, the rotating part is hinged on a fixing axis of the fixing part. Overall structure of the present invention is box-shaped or in the shape of half a box, reinforced ribs are provided at a stator casing and a rotor casing, the present invention is characterized by being of high strength, high rigidity and light, unsprung weight of the entire car can be greatly reduced while strength and rigidity of the hub is satisfied, the present invention involves low cost, high reliability and redundancy, good thermal dissipation and sealing property, strong vibration and impact resistant capacity, good motor unity and improved power density, which is in tune with high power torque requirement of electric cars and large special electric vehicles", cooling and thermal dissipation of the hub motor is realized by circulated water cooling structures, and in this way water leakage is liable to occur and affect normal operation of the motor;

3. In another cited document CN210142953U a thermal insulated hub motor and a vehicle installed with the thermal insulated hub motor is disclosed, "comprising: a braking device, a thermal insulated plate and a hub motor; wherein the thermal insulated plate is installed between the braking device and the hub motor, the thermal insulated plate is respectively connected with the braking device and the hub motor; a gap is provided between the braking device and the thermal insulated plate; the thermal insulated plate is configured to stop transmission of heat generated by the braking device from reaching the hub motor so as to prevent demagnetization of the hub motor caused by temperature rise due to the heat generated due to braking", during using the present device, transmission of the heat to inside the motor is prevented by the thermal insulated plate, however, transmission of the heat from inside the motor to outside thereof has not been realized, therefore, usage safety of the motor can be affected in absence of corresponding thermal dissipation structures for releasing heat generated in the motor, and normal operation of the motor cannot be promised; and 4. In a fourth cited document CN208028721U a hub motor and a hub motor with a braking device is disclosed, "comprising a motor shaft, a rotor assembly and a stator assembly, wherein the rotor assembly comprises a rotor, a covering assembly and a drum brake cover assembly, the drum brake cover assembly comprises a drum brake cover and a brake disc, a ring-shaped cylinder is provided outside the drum brake cover, the brake disc is provided at an inner surface of the ring-shaped cylinder, and the brake disc forms a brake cavity. During assembly of the hub motor with the braking device, the braking device is installed on the motor shaft, an arc-shaped braking block, a flexible piece, a braking shaft, a fixed shaft and a brake rubber of the braking device extend into the braking cavity. During use, pull the brake cable, expand the brake block and the brake rubber to contact and rub an inner cavity of the brake cavity and braking can be done. By integrating the brake rubber and the motor, influence from foreign environment on the hub motor can be reduced, no irregular sound will occur, and the hub motor with the braking device involves simple structures and low cost, and installation and replacement of the braking device is more convenient", however, during braking with the braking device, due to absence of a corresponding signal reminding device, cycles mounted with the hub motor are liable to run in a speed exceeding limits and accidents may occur when braking at a high speed, which affects riding safety.

SUMMARY OF INVENTION

A purpose of the present invention is to provide a hub motor with internally provided torque transducer to address the problem raised in the background technology.

To realize the foregoing purpose, the present invention provides the following technical solution: a hub motor with internally provided torque transducer, comprises a motor and a torque transducer case, an end cover front panel is installed at a front portion of the motor, and the torque transducer case is installed at a front portion of the end cover front panel;

A deformation stress block is installed in the torque transducer box, an inner duct is provided in the deformation stress block, a second pressure transducer is installed at an outer surface of the inner duct close to the deformation stress block, six sets of deformation resistance blocks are installed at an even interval circumferentially around an outer surface of the deformation stress block, first pressure transducers are installed at front portions of the deformation resistance blocks, and an extrusion rotating wheel is engaged in the outer surface of the inner duct far away from the deformation stress block and the extrusion rotating wheel is rotatable;

A transmission pole is installed in the extrusion rotating wheel, and thermal dissipation and explosion proof boxes are installed at a surface of the motor.

Preferably, spacer plates are installed in the thermal dissipation and explosion proof boxes, air inlet ducts and air outlet ducts are installed at bottom surfaces of the thermal dissipation and explosion proof boxes, and the air inlet ducts and the air outlet ducts are respectively provided at both sides of the spacer plates, bottom portions of both the air inlet ducts and the air outlet ducts extend into the motor, check valves with opposite directions are respectively provided in the air inlet ducts and the air outlet ducts, fans are provided at bottom portions of the thermal dissipation and explosion proof boxes, and the fans are at a side of the air outlet ducts far away from the spacer plates, condenser plates are installed at a side of the spacer plates far away from the fans, and the condenser plates are a grating structure.

Preferably, a sealing and thermal insulation module is installed at a front portion of the transmission pole, wherein the sealing and thermal insulation module comprises a thermal conduction pole, a connecting piece, a thermal insulation pole and a splicing pole, the thermal conduction pole is installed at a front portion of the transmission pole, the connecting piece is connected at a tail end portion of the thermal conduction pole, the splicing pole is inserted in the connecting piece, the thermal insulation pole is sleeved over an outer surface of the connecting piece, a diameter of the thermal insulation pole is bigger than a dimension of the splicing pole, a cross section of the splicing pole is a regular hexagon, a front portion of the splicing pole extends until in front of the thermal insulation pole, and ports at a front portion of the splicing pole are connected with flywheels and a chain.

Preferably, an inner pole is installed in the transmission pole, and a front portion of the inner pole extends out of the transmission pole, rolling balls are circumferentially installed at a surface of the inner pole, sliding tracks are provided at an inner surface of the transmission pole and an inner surface of the inner pole, the sliding tracks engage with the rolling balls, a Hall sensor is provided at the surface of the inner pole, a height of the Hall sensor is smaller than a height of the rolling balls, the Hall sensor is provided in the transmission pole and at a side of the rolling balls, and a PLC integrated processor is provided at an inner surface of the inner pole.

Preferably, the PLC integrated processor is electrically connected with the first pressure transducers, the second pressure transducer and the Hall sensor.

Preferably, an end cover rear panel is installed at a front portion of the motor, and the end cover rear panel is connected with the end cover front panel by screws, a stator assembly is installed in the motor, a rotor assembly is installed in the motor, the rotor assembly is provided at a rear portion of the stator assembly, a shaft lever is installed in the rotor assembly, and an end of the shaft lever passes the stator assembly and is connected with an end of the transmission pole, and threaded connection holes are provided at a rear portion of the motor.

Preferably, the deformation resistance blocks are connected with a rear panel of the motor, and the deformation stress blocks are connected with the transmission pole.

Preferably, two sets of symmetrically provided cable wrapping posts are provided on a surface of the motor, the cable wrapping posts and the thermal dissipation and explosion proof boxes are intermittently provided and limiting discs are provided at top portions of the cable wrapping posts.

Preferably, two sets of symmetrically provided correction boxes are provided at a surface of the rotor assembly, and the correction boxes are respectively provided at positions tangent to a transverse diameter of the rotor assembly, electromagnetic relays and magnetic sucking boards are provided in the correction boxes, the magnetic sucking boards are provided underneath the electromagnetic relays, steel posts are provided at top portions of the magnetic sucking boards, diameters of the steel columns are smaller than widths of the magnetic sucking boards, shock insulating frame boards are provided at the top portions of the magnetic sucking boards, top portions of the shock insulating frame boards are connected with bottom portions of the electromagnetic relays, the shock insulating frame boards are at a side of the steel posts, and the electromagnetic relays are electrically connected with the Hall sensor.

Preferably, an electronic power assisted bicycle provided with the hub motor an internally provided torque transducer, wherein working steps of the hub motor are:
  S1: when using the hub motor as disclosed in the present invention for torque output operations of an electronic power assisted cycle, first of all, fixing the motor at an installation box of an electronic power assisted cycle by the threaded connection holes, passing the splicing pole through the installation box, wherein a port at a front portion of the thermal conduction pole extends only 2 cm outside the installation box, most of the thermal conduction pole remains inside the installation box, so that with the thermal conduction pole heat dissipation is partially done and also with imperfect thermal conduction of the thermal insulation pole, foreign heat is prevented from entering the installation box, so that a quite closed environment is formed and normal operation of the hub motor is promised;
  S2: when riding the electronic power assisted cycle, pedaling force from the rider is passed to the splicing pole by the chain and the flywheels, the pedaling force is then transmitted by the splicing pole to the transmission pole, and transmitted further by the transmission pole to the deformation stress block, when starting riding a cycle or when encountering resistance during riding, a force difference will be generated between the deformation stress block and the deformation resistance blocks, the force difference will have both the deformation stress block and the deformation resistance blocks to deform, the pedaling force on the deformation stress block is detected by the first pressure transducers and the resistance at the deformation resistance blocks is detected by the second pressure transducer, and when a difference between the first pressure transducers and the second pressure transducer becomes bigger, a deformation extent will be bigger, at this time, sending corresponding data to the PLC integrated processor, after circuit analysis and processing, a deformation quantity is obtained, sending the corresponding data to the motor and adjusting output power of the motor based on the deformation quantity;

S3: when the deformation quantity is very big, the pedaling force from the rider is big, so that it is known that the rider need auxiliary power from the motor, at this time, the PLC integrated processor will control the motor to increase output power, otherwise to reduce or stop power output from the motor, so that with the present device power output of the motor is continuously adjusted based on magnitude of the pedaling force from the rider so as to assist riding;

S4: when riding up or down a slope path, the rider stops pedaling, and at this time, the chain is still revolving, therefore, the Hall sensor in the transmission pole still measures a value of a revolution speed, which means that, the cycle is riding down along a slope path, and when the Hall sensor detects a high value, the slope path is of a high inclining gradient, it is necessary to take stopping operations timely to promise riding safety, and at this time the PLC integrated processor sends signals to a vehicle mounted voice broadcaster to remind the rider to reduce and stop in time; and S5: when the motor is working, starting the fans, air blown by the fan will enter the motor via the air outlet ducts, after heat exchange, the air enters the thermal dissipation and explosion proof boxes via the air inlet ducts, after condensing at the condenser plates, the air is discharged from holes at the top portions of the thermal dissipation and explosion proof boxes, so that hot air in the motor is cooled down and discharged from the motor, in this way, rapid temperature rise in the installation box which triggers air expansion and explosion is avoided and safety of the device is promised.

Compared with the prior art, beneficial effects of the present invention are:

1. In the present invention, by providing the torque transducer box, the deformation stress block, the deformation resistance blocks, the first pressure transducers, the extrusion rotating wheel, the inner duct and the second pressure transducer, when starting riding a cycle or encountering resistance at the time of riding, the transmission pole rotates so as to drive the extrusion rotating wheel to rotate and extrude the first pressure transducers in the inner duct and detect the pedaling force that the deformation stress block bears, and in this process, the deformation resistance blocks are subject to influences from a rear side of the motor and generates deformation in an opposite direction, and the resistance can be measured by the second pressure transducer, the bigger the value difference between the first pressure transducers and the second pressure transducer is, the bigger the deformation is, at this time, transmit corresponding data to the PLC integrated processor, after circuit analysis and processing, magnitude of the deformation is obtained, transmit the corresponding data to the motor and based on this adjust output power of the motor so as to assist the rider to ride in a more effortless way.

2. In the present invention, by installing the thermal dissipation and explosion proof boxes, the spacer plates, the air outlet ducts, the air inlet ducts, the fans and the condenser plates, internal space in the thermal dissipation and explosion proof boxes can be divided into two independent parts by the spacer plates, starting the fans, the air blown by the fan will enter the motor, the air will return to the thermal dissipation and explosion proof boxes by the air inlet ducts after heat exchange, thereafter the air is cooled down and discharged from holes at the top portions of the thermal dissipation and explosion proof boxes, collective discharging of a large quantity of hot air which may trigger air expansion and possibly explosion can be avoided, thermal dissipation safety of the device can be guaranteed, furthermore, owing to the check valves provided in the air inlet ducts, condensed water in the condenser plate cannot enter the motor via the air inlet ducts even when leakage occurs, so that while cooling the device, water burden can be reduced and abundant installations can be reduced.

3. In the present invention, by providing the sealing and thermal insulation module comprising the thermal conduction pole, the connection piece, the thermal insulation pole and the splicing pole, passing the splicing pole through the installation box, reserving most of the thermal conduction pole in the installation box, the present device realizes heat dissipation with the thermal conduction pole while stopping foreign heat from entering the installation box by the imperfect thermal conductivity of the thermal insulation pole, so that a closed environment is formed and regular operation of the hub motor is promised, furthermore, by engagement between the splicing pole of the present device and the chain and the flywheels of the electronic power assisted cycle, integral connection is realized.

4. In the present invention, by installing the transmission pole, the inner pole, the rolling balls and the Hall sensor, when riding up or down on a slope path, the rider stops pedaling, however, the chain is still rotating, therefore, the Hall sensor measures data of revolution velocity, in this way, it is known that the cycle is moving down along a slope path, when the Hall sensor measures a big value, a gradient of the slope path is big, and it is necessary to take braking measures timely to protect riding safety, at this time, by the PLC integrated processor signals is sent to the vehicle mounted voice broadcaster to remind the rider to reduce speed and brake timely.

Figure 1:
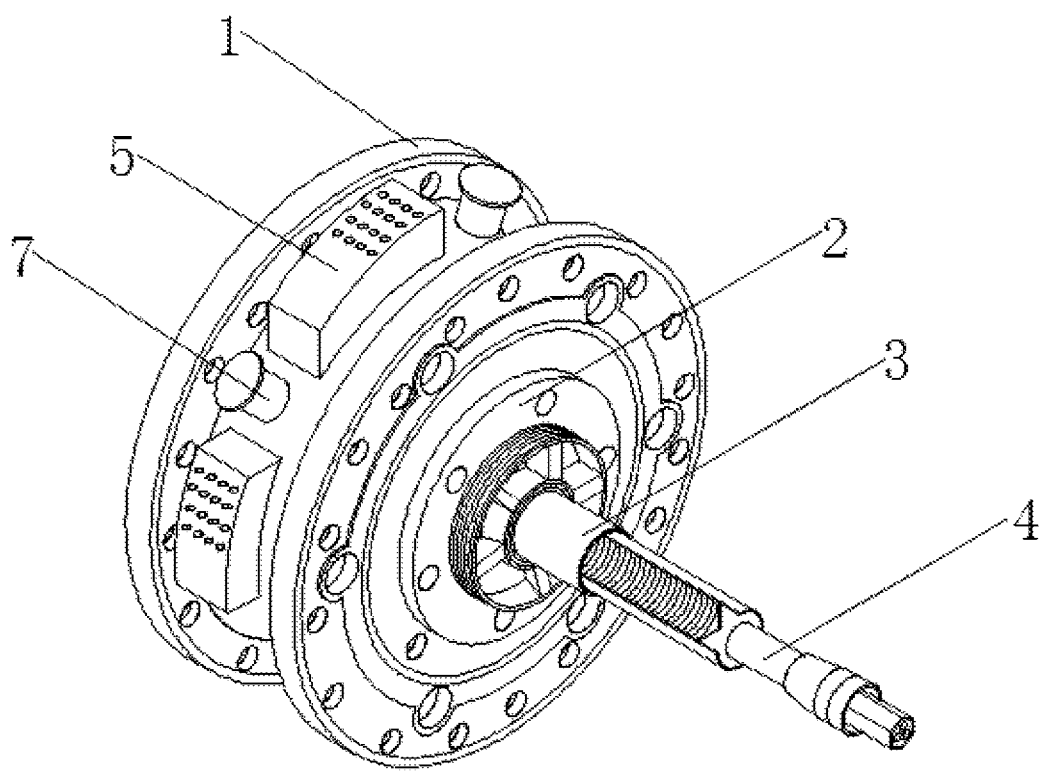
FIG. 1 is a diagram showing overall structures of the present invention.

In the drawings: 1, motor; 101, rotor assembly; 102, stator assembly; 103, end cover front panel; 104, end cover rear panel; 105, threaded connection hole; 2, torque transducer box; 201, deformation stress block; 202, deformation resistance block; 203, first pressure transducer; 204, extrusion rotating wheel; 205, inner duct; 206, second pressure transducer; 3, transmission pole; 301, inner pole; 302, rolling ball; 303, PLC integrated processor; 304, Hall sensor; 4, sealing and thermal insulation module; 401, thermal conduction pole; 402, connection piece; 403, thermal insulation pole; 404, splicing pole; 5, thermal dissipation and explosion proof box; 501, air outlet duct; 502, air inlet duct; 503, condenser plate; 504, fan; 505, spacer plate; 6, correction box; 601, electromagnetic relay; 602, steel post; 603, magnetic sucking plate; 604, shock insulation frame board; 7, cable wrapping post; and 701, limiting disc.

EMBODIMENTS

The technical solutions in the embodiments of the present invention will be clearly and completely described below with reference to the accompanying drawings in the embodiments of the present invention. Obviously, the described embodiments are only a part of the embodiments of the present invention, rather than all the embodiments. Based on the embodiments of the present invention, all other embodiments obtained by those of ordinary skill in the art without creative efforts shall fall within the protection scope of the present invention.

In the description of the present invention, it should be noted that terms "upper", "lower", "inner", "outer", "front end", "rear end", "two ends", "one end" and "the other end" show orientations or positional relationships indicated by etc. based on the orientations or positional relationships shown in the accompanying drawings, and are only for the convenience of describing the present invention and simplifying the description, rather than indicating or implying that the indicated device or element must have a specific orientation, with a specific orientation. The orientation configuration and operation are therefore not to be construed as limitations of the present invention. Furthermore, the terms "first" and "second" are used for descriptive purposes only and should not be construed to indicate or imply relative importance. In the description of the present invention, it should be noted that, unless otherwise expressly specified and limited, the terms "installed", "provided with", "connected", etc. should be understood in a broad sense, for example, "connected" may be a fixed connection It can also be a detachable connection or an integral connection; it can be a mechanical connection or an electrical connection; it can be a direct connection, or an indirect connection through an intermediate medium, or the internal communication between the two components. For those of ordinary skill in the art, the specific meanings of the above terms in the present invention can be understood in specific situations.

Figure 2:
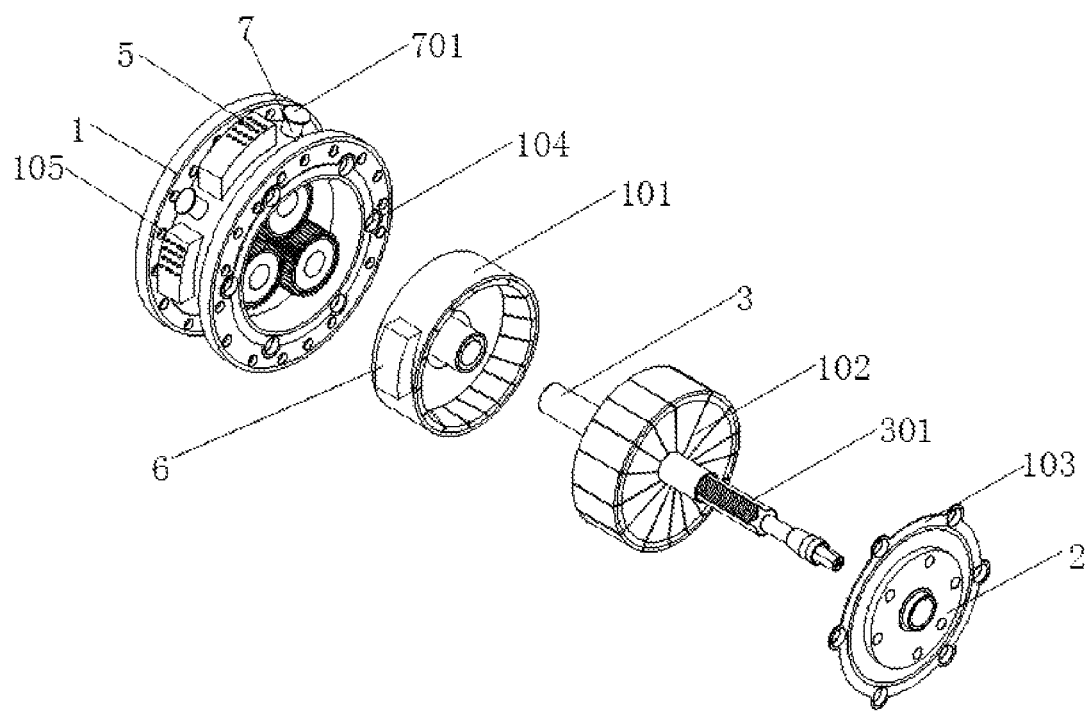
FIG. 2 is a diagram showing internal installation structures of the present invention.
Figure 3:
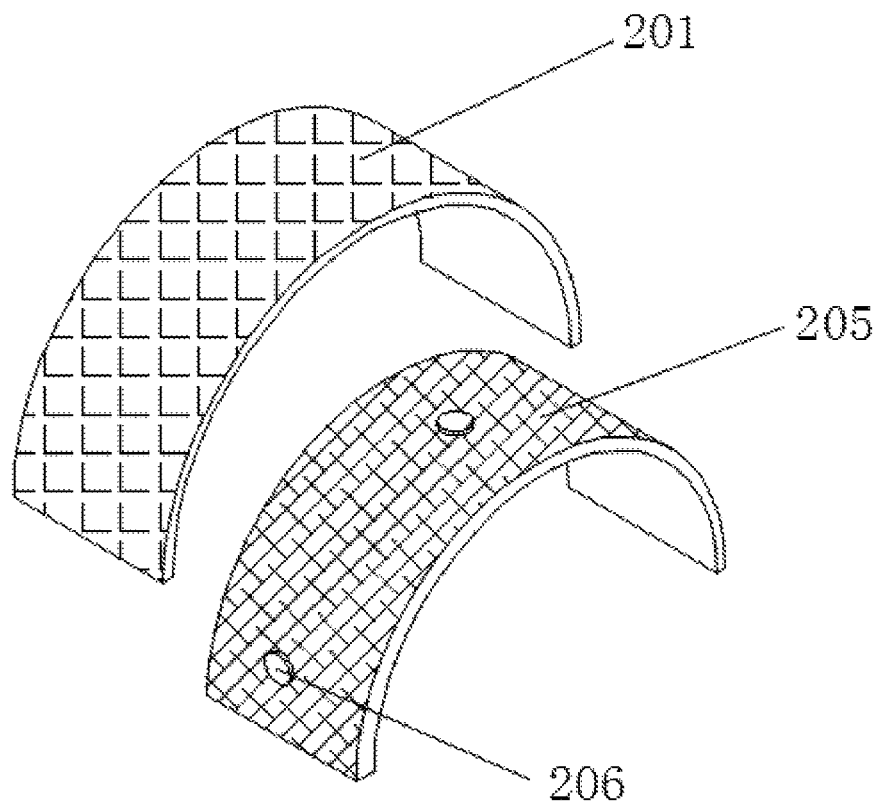
FIG. 3 is a diagram showing installation structures of the deformation stress block, the inner duct and the second pressure transducer.
Figure 4:
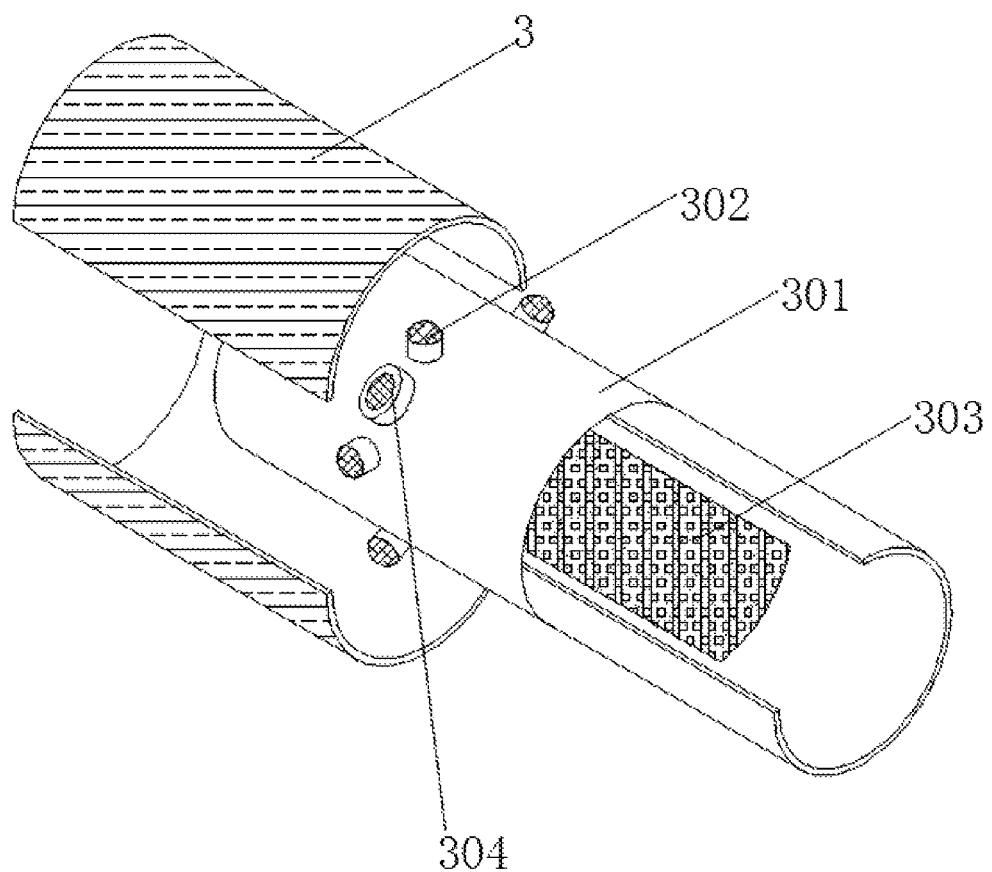
FIG. 4 is a diagram showing internal assembly structures of the transmission duct in the present invention.
Figure 5:
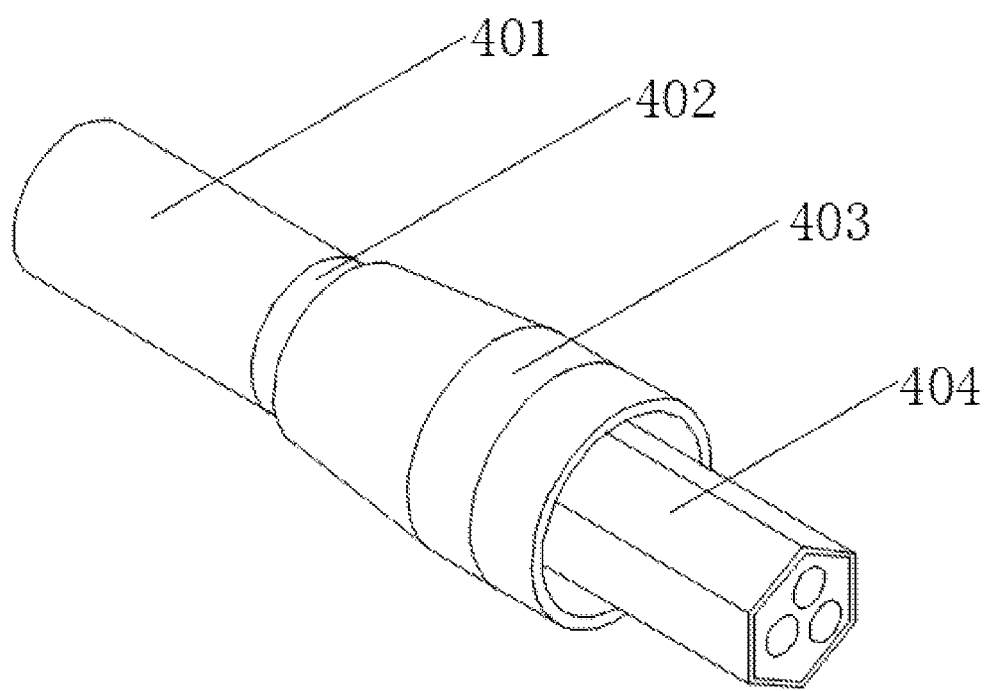
FIG. 5 is a diagram showing assembling structures of the sealing and thermal insulation module in the present invention.
Figure 6:
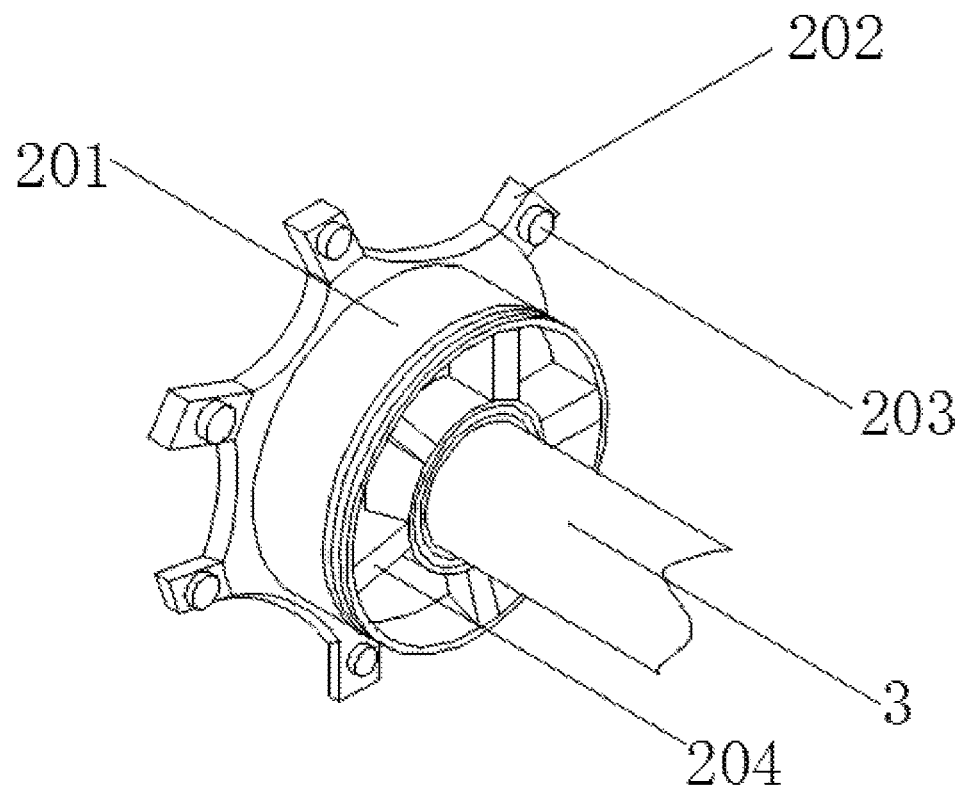
FIG. 6 is a diagram showing installation structures of the deformation stress block, the deformation resistance blocks, the first pressure transducers, the extrusion rotating wheel and the transmission pole in the present invention.
Figure 7:
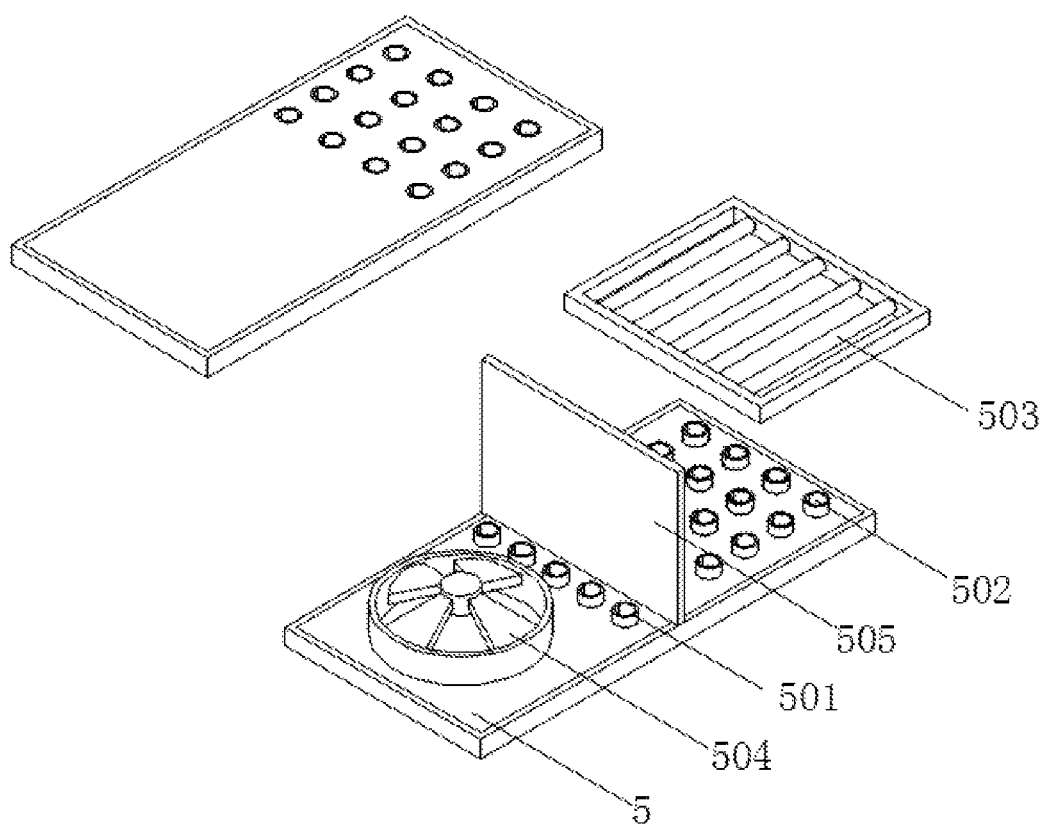
FIG. 7 is a diagram showing assembly structures of the thermal dissipation and explosion proof boxes in the present invention.
Figure 8:
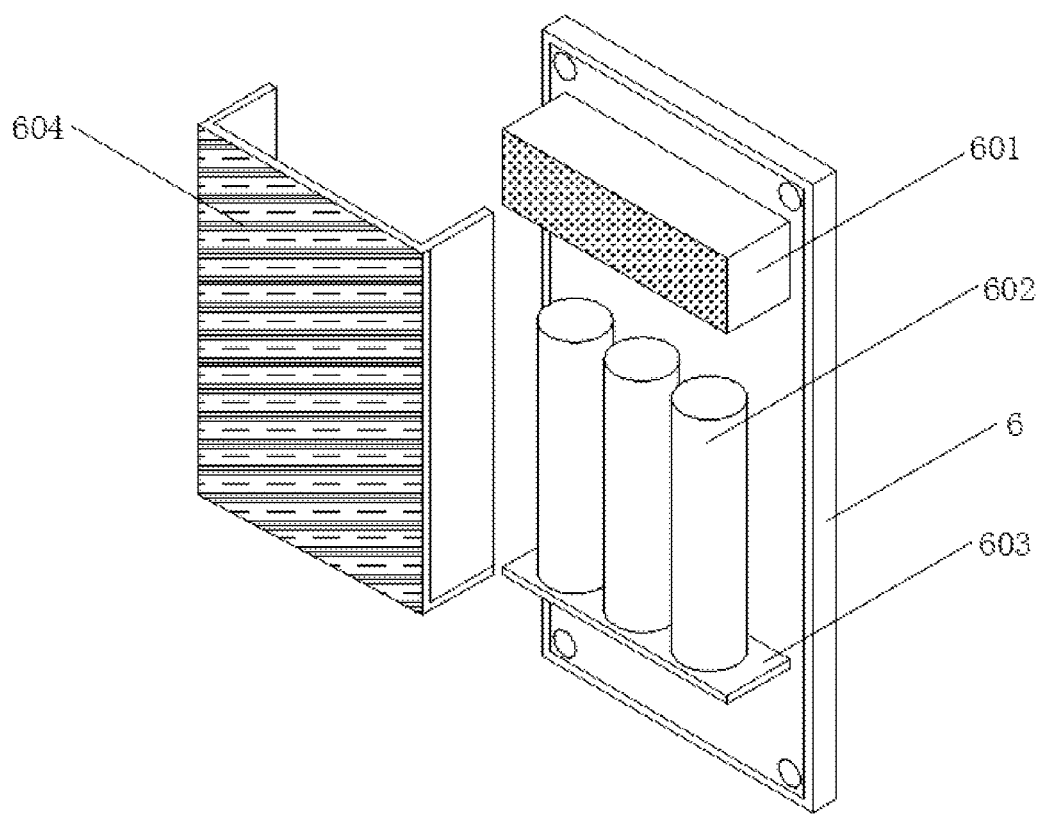
FIG. 8 is a diagram showing assembly structures of the correction boxes in the present invention.

As shown in FIG. 1 to FIG. 8, the present invention provides an embodiment: a hub motor with internally provided torque transducer, comprises a motor 1 and a torque transducer box 2, an end cover front panel 103 for providing installation supports for installation of the torque transducer box 2 is provided at a front portion of the motor 1, the torque transducer box 2 is installed at a front portion of the end cover front panel 103, by interaction between internal structures of the hub motor and foreign structures, utilizing pedaling force from the rider and resistance in the motor, and by measuring magnitude of a force difference between the deformation stress block 201 and the deformation resistance blocks 202, magnitude of deformation can be judged, and from the magnitude of the deformation of the deformation blocks the pedaling force from the rider can be judged and basis can be provided for adjusting output power of the motor 1;

A deformation stress block 201 is installed in the torque transducer box 2, an inner duct 205 is installed in the deformation stress block 201, a second pressure transducer 206 is installed at an outer surface of the inner duct 205 close to the deformation stress block 201, six sets of deformation resistance blocks 202 provided at an even interval are installed circumferentially on an outer surface of the deformation stress block 201, first pressure transducers 203 are installed at front portions of the deformation resistance blocks 202, an extrusion rotating wheel 204 is installed at the outer surface of the inner duct 205 far away from the deformation stress block 201 and the extrusion rotating wheel 204 is slidable, when starting riding a cycle and encountering resistance during riding, the transmission rod 3 rotates and drives the extrusion rotating wheel 204 to rotate and extrude the first pressure transducers 203 in the inner duct 205, so that pedaling force applied on the deformation stress block 201 can be measured, during this process, the deformation resistance blocks 202 are subject to resistance from a rear portion of the motor 1 and deformation in an opposite direction is produced synchronously, and by the second pressure transducer 206 a value of the resistance can be measured, and when a difference between the first pressure transducers 203 and the second pressure transducer 206 is big, the deformation is big, transmitting corresponding data to a PLC integrated processor 303, upon circuit analysis and processing, deformation quantity can be obtained, and transmitting the corresponding data to the motor 1 to adjust output power of the motor 1;

A transmission pole 3 is installed in the extrusion rotating wheel, by the transmission pole 3 during descending along a slope path, reference data for braking information can be provided can be provided to the device, thermal dissipation and explosion proof boxes 5 are provided at a surface of the motor 1, so that hot air in the motor 1 can be cooled and discharged and air expansion and explosion caused by collective discharging of hot air can be avoided and heat dissipation safety of the device can be promised.

Further, a sealing and thermal insulation module 4 is provided at a front portion of the transmission pole 3, the sealing and thermal insulation module 4 comprises a thermal conduction pole 401, a connection piece 402, a thermal insulation pole 403 and a splicing pole 404, the thermal conduction pole 401 is installed at a front portion of the transmission pole 3, the connecting piece 402 is installed at a tail end portion of the thermal conduction pole 401, the splicing pole 404 is installed in the connecting piece 402, the thermal insulation pole 403 is sleeved over the connecting piece 402, a diameter of the thermal insulation pole 403 is bigger than a dimension of the splicing pole 404, a cross section of the splicing pole 404 is a regular hexagon, a front portion of the splicing pole 404 extends to be at a front portion of the thermal insulation pole 403, ports at a front portion of the splicing pole 404 is connected with flywheels and a chain, passing the splicing pole 404 through an installation box, wherein a port at a front portion of the thermal conduction pole 401 is exposed for only a length of 2 cm, most of the thermal conduction pole 401 remains in the installation box, so that the purpose of heat dissipation is completed in part by the thermal conduction pole 401, and external heat can be prevented from entering the installation box due to imperfect heat conductivity of the thermal insulation pole 403, so that a rather closed environment is formed so as to promise regular running of the hub motor, furthermore, by the splicing pole 404 connection between the present device and the chain and the flywheels of the electronic power assisted cycle is realized and the connection is integral.

Further, an inner pole 301 is installed in the transmission pole 3, a front portion of the inner pole 301 extends out of the transmission pole 3, rolling balls 302 are installed circumferentially at a surface of the inner pole, a sliding track is respectively provided at an inner surface of the transmission pole 3 and an inner surface of the inner pole 301, the sliding tracks engage with the rolling balls, a Hall sensor 304 is installed at a surface of the inner pole 301, and a height of the Hall sensor 304 is smaller than a height of the rolling balls 302, the Hall sensor 304 is located in the transmission pole 3 and at a side of the rolling balls 302, a PLC integrated processor 303 is installed at an inner side of the inner pole 301, when riding up or down along a slope path, the rider stops pedaling, and the chain is still rotating, therefore, the Hall sensor 304 can still measure a rotation speed, which means that the cycle is running down a slope path, when the Hall sensor 304 measures a large value, a gradient of the slope path is very high, it is necessary to take braking operations in time to guarantee riding safety, at this time, the PLC integrated processor 303 sends signals to a vehicle mounted voice broadcaster to remind the rider to brake timely, and by installation of the rolling balls, a constant interval can be promised between the inner pole 301 and the transmission pole 3 so as to promise regular operation of the Hall sensor 304.

Further, the PLC integrated processor 303 is electrically connected with the first pressure transducers 203, the second pressure transducer 206 and the Hall sensor 304, so that detection data of the first pressure transducers 203, the second pressure transducer 206 and the Hall sensor 304 is transmitted to be PLC integrated processor for calculation and transmission, and provide reference data for subsequent operations for the present device.

Further, an end cover rear panel 104 is installed at the front portion of the motor 1, the end cover rear panel 104 and the end cover front panel 103 are connected by screws, a stator assembly is installed in the motor 1, a rotor assembly 101 is installed in the motor 1, the rotor assembly 101 is behind the stator assembly 102, a shaft lever is installed in the rotor assembly 101, an end of the shaft lever passes the stator assembly 102 and is connected with an end of the transmission pole 3, threaded connection holes 105 are circumferentially provided at a rear portion of the motor 1, by the threaded connection holes 105 the motor can be installed in the installation box provided in the electronic power assisted cycle stably, by engagement between the end cover front panel 103 and the end cover rear panel 104, the present device is installed compactly without occupying a lot of installation space, and by cooperation of the rotor assembly 101 and the stator assembly 102, the motor outputs rotation torque regularly, operation of the electronic power assisted cycle is assisted and energy consumption of the rider is saved.

Further, deformation resistance blocks 202 are connected with a rear side of the motor 1, the deformation resistance blocks 201 are connected with the transmission pole 3, and provide premise for transmission of pedaling force on pedals and further make it convenient for measuring resistance on surfaces of the deformation resistance blocks 202 and pedaling force on the deformation stress block 201.

Further, two sets of symmetrically provided cable wrapping posts 7 are installed on a surface of the motor 1, the cable wrapping posts 7 are respectively provided at both sides of thermal insulation and explosion proof boxes 5, a limiting disc 701 is installed respectively at top portions of the cable wrapping posts 7, and when relating to installation of cables, the cables can be wrapped around surfaces of the cable wrapping posts 7 and form cable sets in a shape of a long strip and reduce a thickness of accumulated cables, furthermore, by installation and usage of the limiting discs 701, the cables can be prevented from leaving the cable wrapping posts 7 so as to promise smooth cable rolling.

Furthermore, two sets of correction boxes 6 are symmetrically provided on a surface of the rotor assembly 101, the correction boxes 6 are respectively provided at positions tangent to a transverse diameter of the rotor assembly 101, electromagnetic relays 601 and magnetic sucking plates 603 are installed at sides of the correction boxes 6, the magnetic sucking plates 603 are underneath the electromagnetic relays 601, steel posts 602 are placed at top portions of the magnetic sucking plates 603, diameters of the steel posts 602 are smaller than widths of the magnetic sucking plates 603, shock insulation frame boards 604 are installed at top portions of the magnetic sucking plates 603, top portions of the shock insulation frame boards 604 are connected with bottom portions of the electromagnetic relays 601, the shock insulation frame boards 604 are located at either sides of the steel posts 602, the electromagnetic relays 601 are electrically connected with the Hall sensor 304, when it is necessary to brake and stop the cycle, start the electromagnetic relays 601, magnetic forces generated by the electromagnetic relays 601 can absorb the steel posts to move upwards, during movement of the steel posts 602, by use of the shock insulation frame boards 604, the steel posts 602 can be prevented from leaving the surfaces of the magnetic sucking plates 603, as installation positions of the correction boxes 6 are at positions tangent to the rotor assembly 101, when the steel posts 602 move upwards, weight at an upper portion of the rotor assembly 101 can be increased, so that inertial actions of the rotor assembly 101 to deflect downwards can be reduced, inertial torque output can be reduced and braking can be promoted.

Further, working steps of the present device comprise:

S1: when using the hub motor as disclosed in the present invention for providing torque output operations for an electronic power assisted cycle, first of all, fixing the motor 1 at the installation box in the electronic power assisted cycle by the threaded connection holes 105, thereafter, passing the splicing pole 404 through the installation box, wherein the port at the front portion of the thermal conduction pole 401 extends 2 cm and most of the thermal conduction pole 401 reserves in the installation box, in this way, the present device realizes thermal dissipation in part and external heat is prevented from entering the installation box due to imperfect thermal conductivity of the thermal insulation pole 403, therefore, a rather closed environment is formed to promise regular operation of the hub motor;

S2: when riding the electronic power assisted cycle, pedaling force from the rider is passed to the splicing pole 404 by the chain and the flywheels, transmitted to the transmission pole 3 by the splicing pole 404, further to the deformation stress block 201 along with the transmission pole 3, when starting riding the cycle or encountering resistance, a force difference will be generated between the deformation stress block 201 and the deformation resistance blocks 202, and will have both the deformation stress block 201 and the deformation resistance blocks 202 to deform, the pedaling force on the deformation stress block 201 is detected by the first pressure transducers 203, resistance on the deformation resistance blocks 202 detected by the second pressure transducer 206, the bigger a value of a difference between the first pressure transducers 203 and the second pressure transducer 206 is, the bigger the deformation quantity is, at this time, sending corresponding data to the PLC integrated processor 303, after circuit analysis and processing, the deformation quantity is known, transmitting the corresponding data to the motor 1, and adjusting output power of the motor 1;

S3: when the deformation quantity is big, the pedaling force from the rider is big, so it is judged that the rider is in need of auxiliary power from the motor, at this time, the PLC integrated processor 303 will control the motor 1 to increase output power, otherwise, reduce or stop power output of the motor 1, so that the present device always adjusts power output of the motor based on magnitude of the pedaling force from the rider so as to assist riding;

S4: when riding on a slope path, the rider stops pedaling, however, the chain is still rotating, therefore, the Hall sensor 304 in the transmission pole 3 still measures a value of rotation velocity, which represents that the cycle is running down along a slope path, when the Hall sensor measures a big value, the gradient of the slope path is high, so it is necessary to take measures to stop or brake to promise riding safety, at this time, by the PLC integrated processor 303 signals is sent to a vehicle mounted voice broadcaster to remind the rider to stop and brake timely; and S5: when the motor 1 is working, starting the fans 504, air blown by the fans 504 will enter the motor 1 via air outlet ducts 501, after heat exchanged the air enters the thermal dissipation and explosion proof boxes 5 through the air inlet ducts 502, after condensing operations in a condenser plate 503, the air is discharged through holes at top portions of the thermal dissipation and explosion proof boxes 5, so that hot air in the motor is cooled and discharged from the motor 1, rapid temperature rise in the installation box and subsequent air expansion and explosion is prevented and safety of the device is promised.

Working principles: when using the hub motor as disclosed in the present invention for torque output operations of an electronic power assisted cycle, first of all, fix the motor 1 in an installation box in the electronic power assisted cycle with the threaded connection holes 105, pass the splicing pole 404 through the installation box, wherein the port at the front portion of the thermal conduction pole 401 extends out for 2 cm, most of the thermal conduction pole 401 remains in the installation box, so that the present device realizes in part heat dissipation with the thermal conduction pole 401 and stops external heat from entering the installation box, a rather closed environment is formed so as to promise regular running of the hub motor, when a rider rides the electronic power assisted cycle, the pedaling force will be passed by the chain and the flywheels to the splicing pole 404, then to the transmission pole 3 by the splicing pole 404, finally to the deformation stress block 201 by the transmission pole 3, when starting riding the cycle or encountering resistance during riding, a force difference will occur between the deformation stress block 201 and the deformation resistance blocks 202, and will cause both the deformation stress block 201 and the deformation resistance blocks 202 to deform, the pedaling force on the deformation stress block 201 is detected by the first pressure transducers 203 and the resistance on the deformation resistance blocks 202 is detected by the second pressure transducer 206, the bigger the difference between the first pressure transducers 203 and the second pressure transducer 206 is, the bigger the deformation is, at this time, transmitting corresponding data to the PLC integrated processor 303, after circuit analysis and processing, a quantity of the deformation is known, transmit the corresponding data to the motor 1, adjust output power of the motor 1, when the quantity of the deformation is big, the rider is pedaling strongly, it is judged that the rider is in need of auxiliary power from the motor 1, at this time, the PLC integrated processor 303 will control the motor 1 to increase output power, otherwise reduce or stop power output of the motor 1, so that with the present device, power output of the motor is adjusted and controlled continuously based on magnitude of the pedaling force from the rider, so as to assist riding, when riding up or down along a slope path, the rider stops pedaling and the chain is still rotating, therefore, the Hall sensor 304 in the transmission pole 3 still measures a value of the rotation speed, which means that the cycle is running down along a slope path, when the Hall sensor 304 measures a very large value, it is known that a gradient of the slope path is big, braking or stopping measures shall be taken timely to promise riding safety, at this time, the PLC integrated processor 303 will send signals to the vehicle mounted voice broadcaster to remind the rider to stop in time; when the motor 1 is working, start the fans 504, air blown by the fans 504 will enter the thermal dissipation and explosion proof boxes 5, after condensing at the condenser plate 503, the air is discharged through holes provided at top portions of the thermal dissipation and explosion proof boxes 5, so that hot air in the motor 1 is cooled down and discharged out of the motor, rapid temperature rise in the installation box and subsequent air expansion and explosion is avoided and safety of the device is promised.

It will be apparent to those skilled in the art that the present invention is not limited to the details of the above-described exemplary embodiments, but that the present invention may be embodied in other specific forms without departing from the spirit or essential characteristics of the invention. Therefore, the embodiments are to be regarded in all respects as illustrative and not restrictive, and the scope of the invention is defined by the appended claims rather than the foregoing description, all changes made within contents and scope of equivalent parts of the claims are included in the present invention. Any reference signs in the claims shall not be construed as limiting the involved claim.

The invention claimed is:

1. A hub motor with internally provided torque transducer, comprises a motor and a torque transducer case, an end cover front panel is installed at a front portion of the motor, and the torque transducer case is installed at a front portion of the end cover front panel;

a deformation stress block is installed in the torque transducer box, an inner duct is provided in the deformation stress block, a second pressure transducer is installed at an outer surface of the inner duct close to the deformation stress block, six sets of deformation resistance blocks are installed at an even interval circumferentially around an outer surface of the deformation stress block, first pressure transducers are installed at front portions of the deformation resistance blocks, and an extrusion rotating wheel is engaged in the outer surface of the inner duct far away from the deformation stress block and the extrusion rotating wheel is rotatable; and a transmission pole is installed in the extrusion rotating wheel, and thermal dissipation and explosion proof boxes are installed at a surface of the motor;

wherein an end cover rear panel is installed at a front portion of the motor, and the end cover rear panel is connected with the end cover front panel by screws, a stator assembly is installed in the motor, a rotor assembly is installed in the motor, the rotor assembly is provided at a rear portion of the stator assembly, a shaft lever is installed in the rotor assembly, and an end of the shaft lever passes the stator assembly and is connected with an end of the transmission pole, and threaded connection holes are provided at a rear portion of the motor;

wherein the deformation resistance blocks are connected with a rear panel of the motor, and the deformation stress blocks are connected with the transmission pole.

2. The hub motor with internally provided torque transducer according to claim 1, wherein spacer plates are installed in the thermal dissipation and explosion proof boxes, air inlet ducts and air outlet ducts are installed at bottom surfaces of the thermal dissipation and explosion proof boxes, and the air inlet ducts and the air outlet ducts are respectively provided at both sides of the spacer plates, bottom portions of both the air inlet ducts and the air outlet ducts extend into the motor, check valves with opposite directions are respectively provided in the air inlet ducts and the air outlet ducts, fans are provided at bottom portions of the thermal dissipation and explosion proof boxes, and the fans are at a side of the air outlet ducts far away from the spacer plates, condenser plates are installed at a side of the spacer plates far away from the fans, and the condenser plates are a grating structure.

3. The hub motor with internally provided torque transducer according to claim 1, wherein a sealing and thermal insulation module is installed at a front portion of the transmission pole, wherein the sealing and thermal insulation module comprises a thermal conduction pole, a connecting piece, a thermal insulation pole and a splicing pole, the thermal conduction pole is installed at a front portion of the transmission pole, the connecting piece is connected at a tail end portion of the thermal conduction pole, the splicing pole is inserted in the connecting piece, the thermal insulation pole is sleeved over an outer surface of the connecting piece, a diameter of the thermal insulation pole is bigger than a dimension of the splicing pole, a cross section of the splicing pole is a regular hexagon, a front portion of the splicing pole extends until in front of the thermal insulation pole, and ports at a front portion of the splicing pole are connected with flywheels and a chain.

4. The hub motor with internally provided torque transducer according to claim 1, wherein an inner pole is installed in the transmission pole, and a front portion of the inner pole extends out of the transmission pole, rolling balls are circumferentially installed at a surface of the inner pole, sliding tracks are provided at an inner surface of the transmission pole and an inner surface of the inner pole, the sliding tracks engage with the rolling balls, a Hall sensor is provided at the surface of the inner pole, a height of the Hall sensor is smaller than a height of the rolling balls, the Hall sensor is provided in the transmission pole and at a side of the rolling balls, and a PLC integrated processor is provided at an inner surface of the inner pole.

5. The hub motor with internally provided torque transducer according to claim 4, wherein the PLC integrated processor is electrically connected with the first pressure transducers, the second pressure transducer and the Hall sensor.

6. The hub motor with internally provided torque transducer according to claim 1, wherein two sets of symmetrically provided cable wrapping posts are provided on a surface of the motor, the cable wrapping posts and the thermal dissipation and explosion proof boxes are intermittently provided and limiting discs are provided at top portions of the cable wrapping posts.

7. The hub motor with internally provided torque transducer according to claim 4, wherein two sets of symmetrically provided correction boxes are provided at a surface of the rotor assembly, and the correction boxes are respectively provided at positions tangent to a transverse diameter of the rotor assembly, electromagnetic relays and magnetic sucking boards are provided in the correction boxes, the magnetic sucking boards are provided underneath the electromagnetic relays, steel posts are provided at top portions of the magnetic sucking boards, diameters of the steel columns are smaller than widths of the magnetic sucking boards, shock insulating frame boards are provided at the top portions of the magnetic sucking boards, top portions of the shock insulating frame boards are connected with bottom portions of the electromagnetic relays, the shock insulating frame boards are at a side of the steel posts, and the electromagnetic relays are electrically connected with the Hall sensor.

8. An electrical power assisted bicycle provided with the hub motor with internally provided torque transducer according to claim 1, wherein working steps of the hub motor are:

(S1): when using the hub motor as disclosed in the present invention for torque output operations of an electronic power assisted cycle, first of all, fixing the motor at an installation box of an electronic power assisted cycle by the threaded connection holes, passing the splicing pole through the installation box, wherein a port at a front portion of the thermal conduction pole extends only 2 cm outside the installation box, most of the thermal conduction pole remains inside the installation box, so that with the thermal conduction pole heat dissipation is partially done and also with imperfect thermal conduction of the thermal insulation pole, foreign heat is prevented from entering the installation box, so that a quite closed environment is formed and normal operation of the hub motor is promised;

(S2): when riding the electronic power assisted cycle, pedaling force from the rider can be passed to the splicing pole by the chain and the flywheels, the pedaling force is then transmitted by the splicing pole to the transmission pole, and transmitted further by the transmission pole to the deformation stress block, when starting riding a cycle or when encountering resistance during riding, a force difference will be generated between the deformation stress block and the deformation resistance blocks, the force difference will have both the deformation stress block and the deformation resistance blocks to deform, the pedaling force on the deformation stress block is detected by the first pressure transducers and the resistance at the deformation resistance blocks is detected by the second pressure transducer, and when a difference between the first pressure transducers and the second pressure transducer becomes bigger, a deformation extent will be bigger, at this time, sending corresponding data to the PLC integrated processor, after circuit analysis and processing, a deformation quantity is obtained, sending the corresponding data to the motor and adjusting output power of the motor based on the deformation quantity;

(S3): when the deformation quantity is very big, the pedaling force from the rider is big, so that it is known that the rider need auxiliary power from the motor, at this time, the PLC integrated processor will control the motor to increase output power, otherwise to reduce or stop power output from the motor, so that with the present device power output of the motor is continuously adjusted based on magnitude of the pedaling force from the rider so as to assist riding;

(S4): when riding up or down a slope path, the rider stops pedaling, and at this time, the chain is still revolving, therefore, the Hall sensor in the transmission pole can still measures a value of a revolution speed, which means that, the cycle is riding down along a slope path, and when the Hall sensor detects a high value, the slope path is of a high inclining gradient, it is necessary to take stopping operations timely to promise riding safety, and at this time the PLC integrated processor can sends signals to a vehicle mounted voice broadcaster to remind the rider to reduce and stop in time; and (S5): when the motor is working, starting the fans, air blown by the fan will enter the motor via the air outlet ducts, after heat exchange, the air enters the thermal dissipation and explosion proof boxes via the air inlet ducts, after condensing at the condenser plates, the air is discharged from holes at the top portions of the thermal dissipation and explosion proof boxes, so that hot air in the motor is cooled down and discharged from the motor, in this way, rapid temperature rise in the installation box which triggers air expansion and explosion is avoided and safety of the device is promised.

* * * * *